United States Patent [19]

Hall, Jr. et al.

[11] Patent Number: 5,715,238
[45] Date of Patent: Feb. 3, 1998

[54] APPARATUS AND METHOD FOR DETECTING A LOSS OF A TELECOMMUNICATIONS CHANNEL CONNECTION

[75] Inventors: Orlyn C. Hall, Jr., Lacey's Spring; Lee T. Gusler, Jr., Huntsville, both of Ala.

[73] Assignee: Motorola, Inc., Schaumburg, Ill.

[21] Appl. No.: 575,200

[22] Filed: Dec. 20, 1995

[51] Int. Cl.$^6$ ............................................. H04J 3/14
[52] U.S. Cl. .................. 370/242; 370/248; 371/71
[58] Field of Search .......................... 370/241, 242, 370/243, 246, 247, 248, 249, 276, 277, 278, 279, 282, 284, 286; 371/67.1, 68.1, 69.1, 71

[56] References Cited

U.S. PATENT DOCUMENTS

| | | | |
|---|---|---|---|
| 4,266,293 | 5/1981 | Anderson et al. | 370/228 |
| 4,959,805 | 9/1990 | Ohouchi et al. | 364/562 |
| 5,187,705 | 2/1993 | Mano | 370/244 |
| 5,331,628 | 7/1994 | Cheng et al. | 370/248 |
| 5,581,228 | 12/1996 | Cadieux et al. | 340/146.2 |

*Primary Examiner*—Hassan Kizou
*Assistant Examiner*—Kwang Bin Yao
*Attorney, Agent, or Firm*—Nancy R. Gamburd

[57] ABSTRACT

An apparatus and method are provided for a data communications device (100), such as a modem, to detect the loss of a telecommunications channel connection, in the absence of other notification signals. The apparatus and method embodiments of the invention utilize a near end echo in full duplex transmission, and compare (630) periodically sampled transmit data (610), preferably composed of an n-bit sequence, with sampled values of received data (620), to determine the occurrence of a match between the data received and the data transmitted (640). If a predetermined number of consecutive matches have occurred (670), then a loss of a telecommunications channel connection has occurred and is detected (680). Preferably, the apparatus is embodied in a processor (108) or a processor (107) coupled with a digital signal processor (106), which are within the data communications device (100).

33 Claims, 4 Drawing Sheets

APPARATUS AND METHOD FOR DETECTING A LOSS OF A TELECOMMUNICATIONS CHANNEL CONNECTION

FIELD OF THE INVENTION

This invention relates in general to data communications equipment, and more specifically, to an apparatus and method for detecting a loss of a telecommunications channel connection.

BACKGROUND OF THE INVENTION

Presently, data communications devices ("DCDs"), such as analog modems, digital modems, and ISDN terminal adapters, are used to transport data and other information between different data terminal equipment ("DTE"), such as personal computers, workstations, network and mainframe computers, over channels such as a public switched telephone network ("PSTN"), a cellular or other wireless network, a private telephone network, or a digital network. Typically the DCD may have some method for turning off, shutting down or disengaging from the network, when the network or other channel is disabled or disconnected. Typical prior art methods include detecting a loss of line current or detecting other notification signals transmitted by the service provider, such as a long series of digital zeros (long space disconnect). There are many situations and areas, however, in which a line current or other notification signals are not provided, such as in many countries outside of the North American continent. In addition, there are also circumstances in which users intentionally disable the disconnect equipment which detects such loss of line current or other notification signal, for example, because a long sequence of idles in an actual data stream may be very similar to a long space disconnect. In such circumstances, the DCD may not recognize the loss of a telecommunications channel connection, and may remain operational and continue transmitting data, while no data is actually being transferred and received at the far end or remote location.

As explained in greater detail below, upon a disconnection, the receiver of the DCD may receive a significantly increased echo from its transmitter, echoing back to the receiver the data the transmitter was purporting to send. In many circumstances, the DCD may not recognize that it is receiving its own transmitted data, and also may continue to maintain a false connection, i.e., remain operational and continue transmitting, while no data is actually being transferred and received at the far end or remote location.

One prior art method for determining if a DCD such as a modem is receiving its own transmitted data (or echo) is to compare a long stream of previously transmitted data with a long stream of received data, with the comparative reference appropriately accounting for any transmission delays. This comparison may be accomplished either by the DCD or by the attached DTE. While this method has tended to work well, this method requires substantial processor time, significant processor resources, many additional lines of processor code, and additional and significant computer random access memory (RAM). This method also typically requires a modem to operate a second descrambler containing the inverse polynomial of the scrambler, because a typical modem descrambler would operate using a different polynomial. Even though this data comparison method may allow a modem or other DCD to detect the reception of its echo and the corresponding probable loss of a telecommunication connection, the significant processor requirements may render this method less efficient, more expensive, and less desirable.

Another prior art method for detecting a disconnection and the possibility of a modem receiving its own transmitted data relies on using an automatic gain control (AGC) monitor. This method depends upon a sudden change in the gain of the AGC circuit or in the values of equalizer coefficients upon a disconnection, because the power level of the received data signal (transmitted from a remote location) is typically lower than the power level of the echo (transmitted from the same, local location). While this method typically performs well in most cases, a false detection may occur when a "gain hit" (a well-known telecommunication channel impairment) occurs, or when the received data and an echo have similar or equal power levels. Accordingly, this AGC monitoring method may be unreliable and, therefore, not entirely satisfactory.

In addition, another prior art method of detecting a disconnection utilizes the reception of protocol responses, such as responses required under an error detection protocol such as International Telecommunication Union (ITU) Recommendation V.42. If the local modem does not receive protocol responses from the remote modem, such as an acknowledgement signal, then a protocol monitor detects the loss of a communication channel connection. Such protocols, however, are not used in all situations. For example, some modems (especially lower speed modems) may not have error protocols available in the selected (trained) mode of operation, or the error control protocol has not been enabled for other reasons. Although relatively simple and inexpensive, this method is considered unreliable.

Accordingly, a need has remained to reliably detect the loss of a telephone connection in the absence of a notification signal. In addition, a need has remained to perform such detection efficiently, with minimal complexity, minimal response time, and with reduced processor and memory complexity and expense.

DETAILED DESCRIPTION OF THE INVENTION

Figure 1:
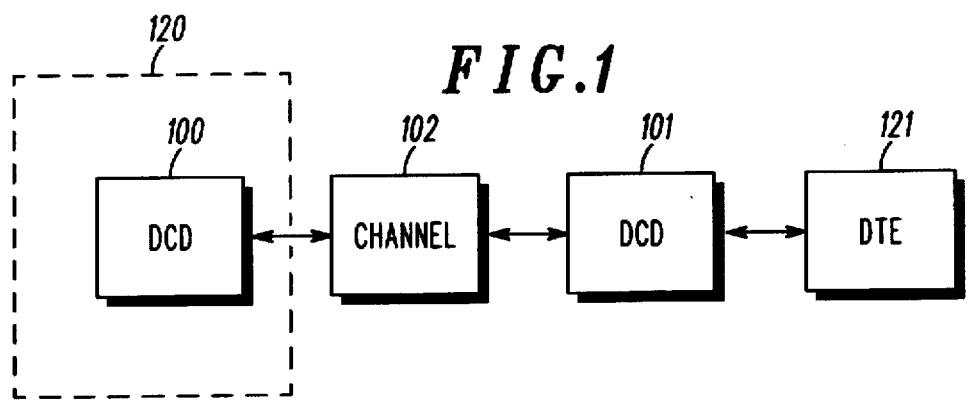
FIG. 1 is a block diagram illustrating a local modem and a remote modem connected to each other via a channel, for full duplex data transmission and reception.

During full duplex data transfer, when both a local modem (or other DCD) and a remote modem (or other DCD) are sending data, typical high speed modems have echo cancelers to cancel both near end and far end echoes. As mentioned briefly above, these echoes are generated because of impedance mismatches between the local modem and the network (or other channel), referred to as the near end echo, and between the network (or other channel) and the remote modem, referred to as the far end echo. The International Telecommunication Union (ITU) Recommendation V.34, for example, requires echo canceling functions in V.34 compatible modems used for making high-speed data connections. In addition, in order to establish a communications link and to compensate for various distortions, impairments, and modifications which may exist in the channel or which may otherwise occur during data transmission, various protocols and standards have evolved, such as ITU Recommendations V.25, V.32, and the recent V.34, involving the use of a variety of signals, such as probe signals, the answer back tone signal, and the amplitude modulated answer back tone signal. Under these various protocols, each of these defined signals has predetermined, defined characteristics, and are transmitted from each DCD (as sender) to the other DCD (as receiver), during the initial communication period (training period) in which the two devices train with each other for matters such as selection of data rates, carrier frequencies, equalizer initialization, power level adjustment and other matters. Subsequently, each DCD may also retrain with the other.

A common problem that occurs in a modem or other DCD having an echo canceler is the known phenomenon of the modem receiver training on its own echo signal, usually the near end echo. With most analog modems typically being used for data transmission over a single twisted pair of wires for many types of networks such as the PSTN, modems typically require a dial (or data) access arrangement (DAA) to interface to the network twisted pair. DAAs are known in the art and are typically comprised of a variety of electronic components for impedance matching, power level adjustment, and two to four wire interconversion. DAAs also typically include a hybrid circuit, which is a three port interface device (serving as a signal splitter and combiner) for coupling four wires (an analog transmit pair of wires and a receive pair of wires) to two wires (the single network pair of wires). To some degree, the hybrid circuit also diminishes echos, depending upon the match between the impedance of the hybrid circuit and the impedance viewed from the hybrid circuit toward the first point of switching of the telecommunication network (referred to as the central office). Typically, the hybrid circuit is designed to operate at a near optimum level when a nominal impedance value of approximately 600 Ohms is across its network port (the network pair). When the network changes from connect to disconnect, however, a sudden and substantial impedance change occurs, from the nominal impedance value to essentially an open circuit (infinite) value, causing a corresponding sudden and substantial increase in the near end echo (from a modem transmitter to its receiver). A modem echo canceler typically cannot follow (or track) the sudden change, as the modem equalizer typically tracks to the near ideal signal much faster than can be cancelled by the echo canceler. In these circumstances, the echo is interpreted by the modem as a receive signal, causing the modem to train on its own echo and maintain an apparant, false connection, with no data being actually transferred.

If the modem is training on its own echo signal, then the appropriate procedure is to shut down the modem and disconnect the telecommunication channel (if it is connected). As mentioned above, in the absence of a loss of line current and various other disconnection notification signals, a need remains to have an apparatus and method which may detect and determine whether a modem (or other DCD) receiver is training and tracking on an echo from its own transmitter, rather than receiving data actually transferred from another source, such as a remote modem transmitter. The apparatus and method in accordance with the present invention is able to detect the loss of a telecommunication channel connection, in the absence of a loss of line current or other notification signals, and performs such detection efficiently, with minimal complexity, minimal response time, and with reduced processor and memory complexity and expense.

FIG. 1 illustrates a first DCD 100, such as a first modem or first facsimile device, connected to a second DCD 101, such as a second modem or second facsimile device, via a channel 102, such as the public (or general) switched telephone network ("PSTN" or "GSTN"). The first DCD 100 is also connected within a first DTE 120, for example, as a processor modem, as a PCMCIA card, or as a circuit board inside a personal computer. The second DCD 101 is illustrated in an equivalent, alternative manner, namely, externally connected to a second DTE 121, for example, as a free standing modem. The first and second DCDs illustrated in FIG. 1 may operate in full-duplex mode, such that each may transmit data and receive data at the same time. The first DCD 100 may be in either a local or remote location and correspondingly, the second DCD 101 may be in either a remote or local location. In addition, either or both DCDs may incorporate the method and apparatus of the present invention.

Figure 2:
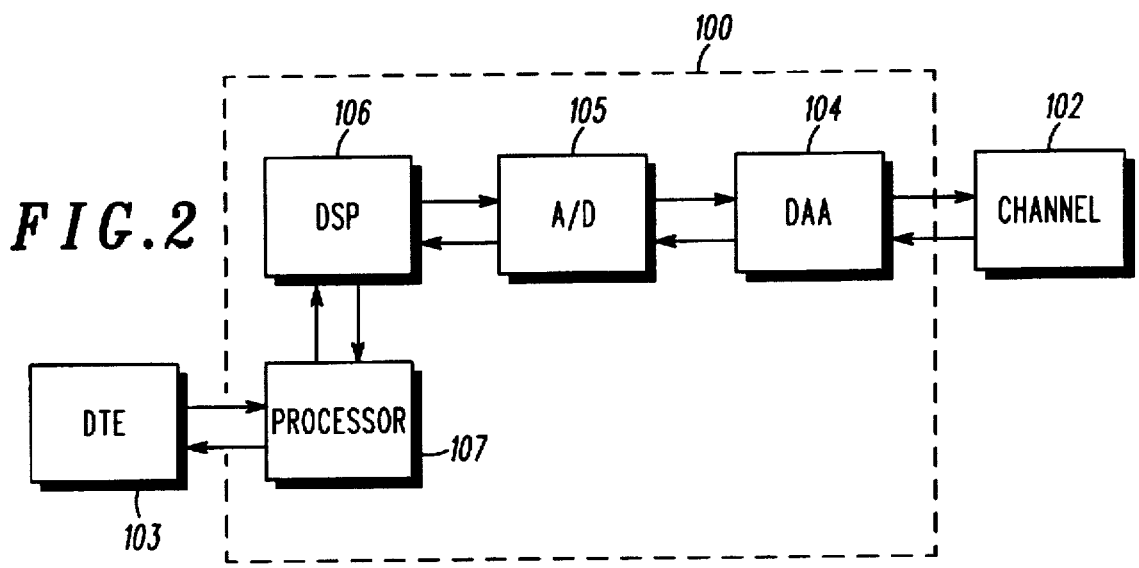
FIG. 2 is a block diagram illustrating a first embodiment of a modem, other DCD or other apparatus in accordance with the present invention.

FIG. 2 is a block diagram illustrating a first embodiment of a modem or other DCD in accordance with the present invention. As shown in FIG. 2, a modem 100 is coupled to a DTE 103, such as a computer, and coupled to a channel 102, for data transmission and reception. Within the modem, a dial (or data) access arrangement 104 known as a "DAA" may transmit and receive an analog signal transmitted on the channel 102. As mentioned above, DAAs are known in the prior art and may be made of a variety of discrete components, including analog multiplexers, resistors, capacitors, hybrid circuits, and operational amplifiers, or may be embodied in whole or part as an integrated circuit, and performs such functions as impedance matching and power level adjustment. Typically connected to the DAA 104 is a analog-to-digital and digital-to-analog converter 105, referred to herein as an analog-digital ("A/D") converter (or, equivalently, a coder-decoder ("codec")), such as an SGS Thompson ST 7544 or ST 7545, which samples and converts an analog signal received from the channel 102 to digital form, and converts digital information to analog form for transmission over the channel 102. The A/D converter 105 is then connected to a digital signal processor ("DSP") 106, such as a Motorola M56002. The DSP is used in a first embodiment of the invention herein, performing the various functions described in detail below. The DSP 106 is connected to a microprocessor 107, such as a Motorola M68302, which may be coupled to a DTE 103 to transmit and receive digital information.

Figure 3:
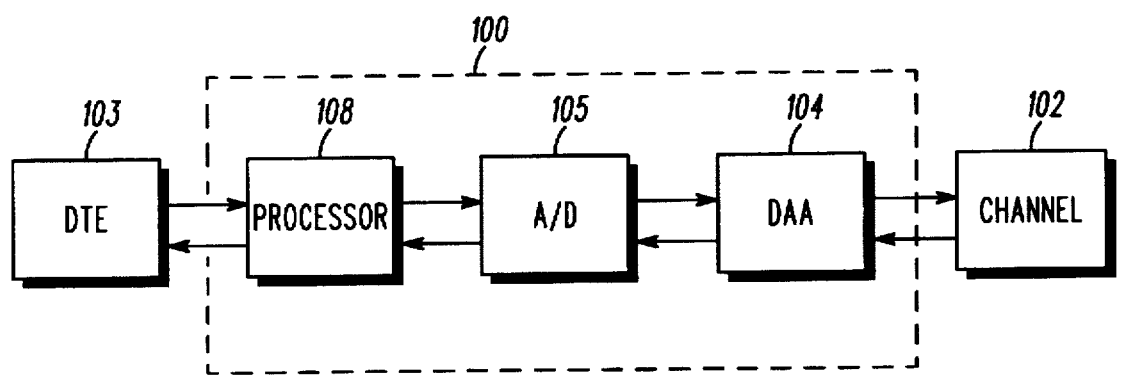
FIG. 3 is a block diagram illustrating a second embodiment of a modem, other DCD or other apparatus in accordance with the present invention.

FIG. 3 is a block diagram illustrating a second embodiment of a modem or other DCD in accordance with the present invention. Referring to FIG. 3, the DAA 104 performs the same functions, has the identical components, and is similarly connected as previously discussed with reference to FIG. 2. As in the modem 100 of FIG. 2, in the modem 100 of FIG. 3, an A/D converter (or, equivalently, a codec) 105 to convert analog signals to digital, sampled signals, and to convert digital, sampled signals to analog signals. In contrast with the modem 100 of FIG. 2, however, FIG. 3 illustrates a processor 108, such as a Motorola M68356, which performs the functions of both the DSP 106 and the microprocessor 107 of FIG. 2. The processor 108 is utilized in a second embodiment of the invention herein, also performing the various functions described in detail below. The processor 108 may also be coupled to a DTE 103 to transmit and receive digital information. As a consequence of the interchangeability of a DSP with a processor in these various embodiments, the terms DSP, processor (or microprocessor) are used interchangeably and inclusively herein, such that use of one term may be interpreted to mean and include the various other forms or types of processor arrangements.

Figure 4:
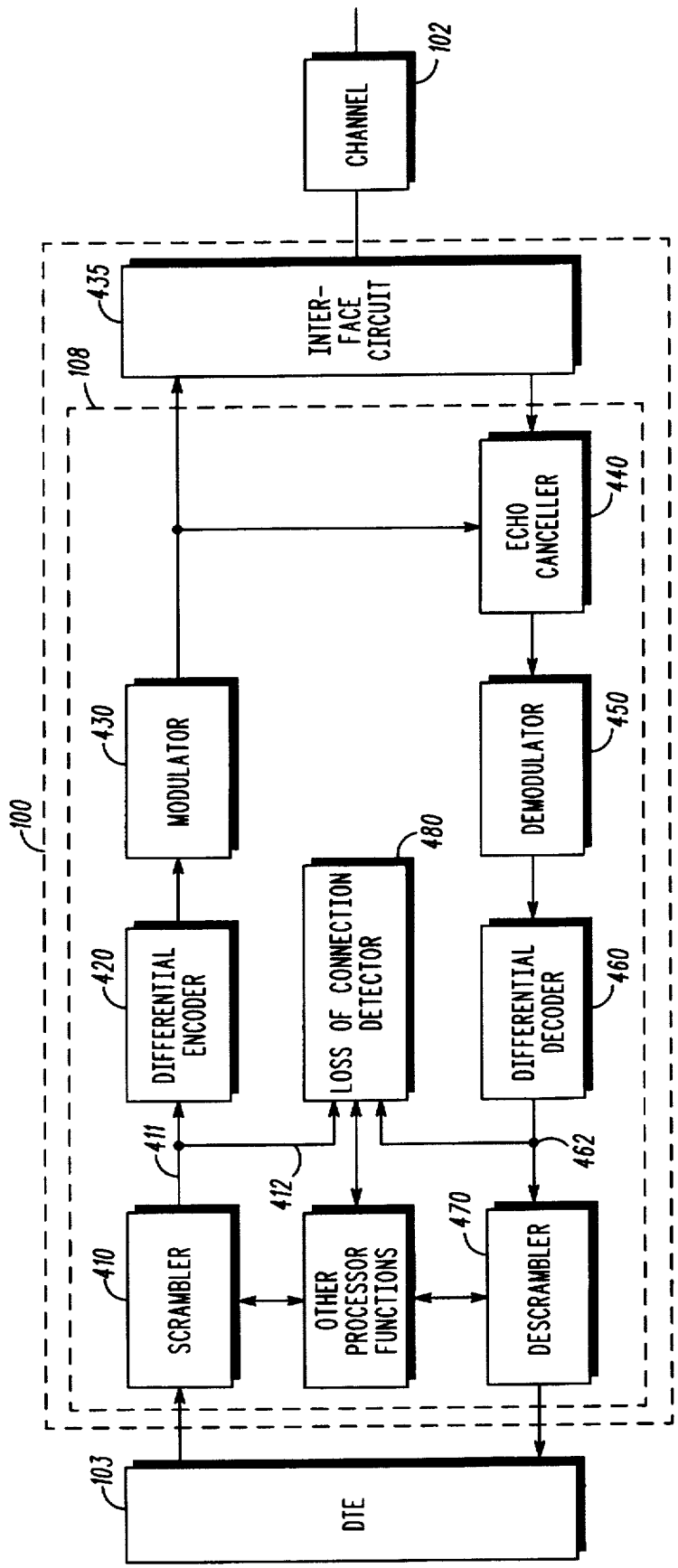
FIG. 4 is a block diagram illustrating in detail the functional blocks of an apparatus embodiment in accordance with the present invention.

FIG. 4 is a block diagram illustrating in detail the functional blocks or components of an apparatus embodiment in accordance with the present invention. The various functional blocks (other than the interface circuit 435) illustrated in FIG. 4 may be embodied in a processor, such as processor 108, or in a processor and a DSP, such as processor 107 and DSP 106. Referring to FIG. 4, digital data for subsequent transmission from the DTE 103, referred to as terminal digital data, is coupled to the DCD 100, and is first sent to a scrambler 410. The scrambler 410 scrambles the terminal digital data in accordance with any type of standard scrambler algorithm, such as the scrambler methodology described in ITU Recommendation V.34. The scrambled digital data for transmission (also referred to as transmit scrambled data or as transmit data) is coupled on line (or connector) 411 to both a loss of connection detector 480 and to a differential encoder 420. The output of the differential encoder is coupled to a modulator 430, which generates a digital transmit signal, usually a series of (quadrature, I and Q) constellation points. The digital transmit signal is coupled to an interface circuit 435, which as a functional block comprises an ND converter and a DAA, and which converts the digital transmit signal to an analog transmit signal for transmission on the telecommunications channel 102. In addition, the digital transmit signal is coupled to an echo canceler 440. The echo canceler 440 internally generates replicas of echoes, for canceling echo return signals which are coupled through the interface circuit 435 with a received analog signal.

Continuing to refer to FIG. 4, the analog received signal from, for example, a remote modem communicating in full-duplex mode via telecommunications channel 102, is converted to a digital received signal in the A/D converter component of the interface circuit 435 and, as mentioned above, with the digital transmit signal, is coupled to the echo canceler 440. The output of the echo canceler 440, which is a cancelled digital received signal, is coupled to a demodulator 450. The demodulator 450 generally includes an equalizer and jitter tracker, and also generates a sequence of received constellation points, which are input to a differential decoder 460, which generates received (and scrambled) data from the received constellation points (also referred to as received scrambled data or as received data). The received, scrambled data is coupled to a descrambler 470 and to the loss of connection detector 480 by line (or connector) 462. The descrambler 470 converts the received, scrambled data into received, descrambled data which may be utilized by the DTE 103, referred to as terminal received data. As explained in greater detail below, the loss of connection detector 480 compares portions of the transmit scrambled data from the scrambler 410 with the received scrambled data to determine if a loss of connection has occurred on the telecommunications channel 102.

Figure 5:
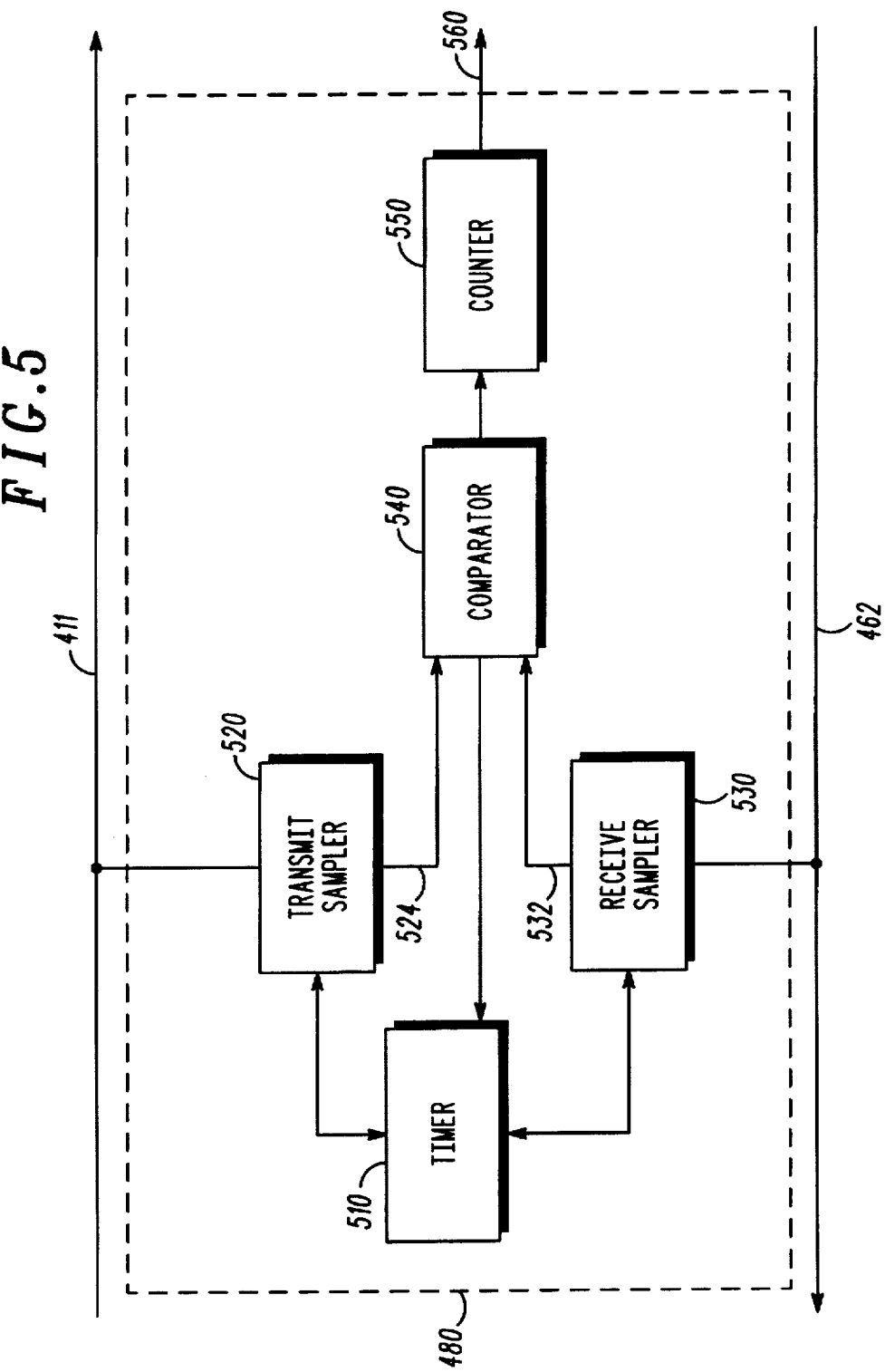
FIG. 5 is a block diagram illustrating the functional blocks of a disconnection or loss of connection detector apparatus in accordance with the present invention.

FIG. 5 is a block diagram illustrating the functional blocks of a loss of connection detector 480, which in the preferred embodiment is implemented within a processor (such as processor 108, or processor 107 with DSP 106) containing a set of program instructions in accordance with the present invention. A transmit sampler 520 samples the transmit data (transmit scrambled data) at a periodic rate for a period of time derived from the symbol (or baud) rate (and/or bit rate) of the modem, and periodically generates a stream of "n" adjacent bits from the transmit data. The symbol rate (and/or bit rate) of the modem is established during the modem training period. A value for the periodic rate is empirically determined and is stored as a predetermined periodic time in a timer 510 (which is coupled to the transmit sampler 520). In the preferred embodiment, the value of the periodic rate is greater than the time required for the transmit data to traverse a loop delay through the differential encoder 420, the modulator 430, the interface circuit 435, the echo canceler 440, the demodulator 450 and the differential decoder 460. In a modem such as a Motorola Lifestyle® 28.8, a loop delay time may have a value of approximately 20 milliseconds. It has been empirically determined that a value for the periodic sampling rate of approximately 60 milliseconds allows the apparatus of the present invention to reliably detect its echo, i.e., to detect when the modem is receiving its own transmit data. As mentioned above, the output of the transmit sampler 520 is an n-bit sequence of adjacent bits from the transmit data, which may (and presumably will) vary with the variance of the transmit data, namely, the n-bit sequence will have different bit values each time a transmit signal is periodically sampled by the transmit sampler 520. Typically, the number of bits in the n-bit sequence varies from 4 to 11 bits, and is 8 bits in the preferred embodiment. The period of time during which the transmit data is sampled is related to the number of bits selected for the n-bit sequence, and to the bit rate (bits/sec) or, equivalently, to the symbol rate (symbols/sec) and the number of bits per symbol (bits/symbol) determined during the training period. The n-bit sequence is coupled to a comparator 540 over line 524 and stored in a memory within the comparator 540, i.e., stored within the resident memory (such as random access memory) of the DSP or processor. Initially, until a match may be generated as discussed below, the received data (received scrambled data) is continuously sampled by a receive sampler 530 to provide a receive data bit sequence to the comparator 540. The receive data bit sequence is coupled to the comparator 540 via line 532. Continuing to refer to FIG. 5, when the comparator 540 receives the receive data bit sequence, a comparison is made between the receive data bit sequence and the n-bit sequence (stored in the comparator memory). The comparator 540 sequentially, shifting one bit for each comparison episode, compares n adjacent bits of the receive data signal with the n-bit sequence in order to determine if an exact match (data match) has occurred. To illustrate, for the first comparison, the comparator 540 compares the first n-bits of the receive data bit sequence with the n-bit sequence of transmit data. If no match is found, another comparison episode occurs, with the comparator 540 then comparing bits 2 through (n+1) of the receive data bit sequence with the n-bit sequence of transmit data. Again, if no match occurs, then another comparison episode occurs, with the comparator 540 then comparing bits 3 through (n+2), and so on, continuing with such comparison episodes for the entire bit stream of the receive data bit sequence. Using n=8, an exact match, for example, might be an eight bit sequence of transmit data consisting of 01011001 matched with another eight bit sequence of received data consisting of 01011001, but not 11011001. Continuing to refer to FIG. 5, if no match is found during any of the comparison episodes, the comparator 540 sends a negative count signal to a counter 550. As indicated above with respect to periodic sampling, another series of comparisons occurs, utilizing the next n-bit sequence of transmit data (sampled during the next periodic sampling) and the next receive data bit sequence, with the comparator 540 continuing comparison episodes to determine whether there is a match between any given sequence of n adjacent bits of the next n-bit sequence and the next receive data bit sequence.

Continuing to refer to FIG. 5, when the counter 550 receives a negative count signal (no match having occurred during that period of sampling), the counter 550 then resets to a predetermined count value of "N". For example, in a preferred embodiment, the value of N is 20 (and may be chosen to be any value deemed significant to avoid false disconnections). If the comparator 540 has found a match, however, it sends a positive count signal to the counter 550 and a delay signal to the timer 510. The counter 550, which may be a down counter, responds by decrementing (incrementing if an up counter) the current counter value. The delay signal is used to set a receive time in the timer 510, which is approximately equal to the loop delay time. The receive time is also used in the receive sampler 530, which as alluded to above, will no longer continuously sample the received data, but will sample the received data only periodically according to the duration of the receive time, and allows the comparator 540 to avoid unneccessary comparisons caused by the loop delay time. If the timer 510 does not receive the delay signal, the receive time has a default value of zero, i.e., continuous sampling of the received data. If N successive matches have occurred, namely, if the comparator 540 has transferred N consecutive positive count signals to the counter 550, the counter 550 generates a disconnect flag (or disconnect signal) on line 560, indicating that the modem (or other DCD) is receiving its own echo rather than receiving actual data from a remote location. The disconnect signal may then be utilized by the DCD to indicate a loss of a telecommunications connection, and in the preferred embodiment, the disconnect signal causes the modem or other DCD to terminate the false connection and to shut down.

Embodiments other than that illustrated in FIG. 5 are also contemplated. The embodiment of the apparatus as shown in FIG. 5 illustrates elements for sampling and comparing data for transmission and data which has been received. If a predetermined number of matches have occurred involving periodically sampled n-bit sequences, then a disconnect flag is generated to indicate the occurrence of a disconnection. Equivalently, the various periodic sampling could occur at any number of stages, for example, using the digital transmit signal from the modulator and the canceled digital receive signal, or using the terminal digital data (for transmission) and the terminal receive data. Also equivalently, those skilled in the art could switch the location of the transmit sampler 520 and the receive sampler 530, and periodically sample the received data to form an n-bit sequence, and then sequentially compare a received n-bit sequence with a sequence of the transmit data to obtain equivalent results. Accordingly, the n-bit sequence could be equivalently generated from either the data for transmission or the received data, which may then be referred to as a first data stream or first data sequence, and the second sequence utilized in the comparison may be generated correspondingly from either the received data or from the data for transmission, referred to as a second data stream or second data sequence.

In addition to these equivalents, there may also be innumerable apparatus equivalents. For example, the counter 550 also could be replaced by a voting apparatus or an accumulator, which operate similarly to a counter, and obtain a reliable detection of a disconnect. A voting apparatus, for example, may determine a percentage of positive count signals contained in the total number of count signals (positive and negative) received. Accumulators add and subtract count signals for a predetermined amount of time and have an cumulative value that is available for a decision step or process.

Figure 6:
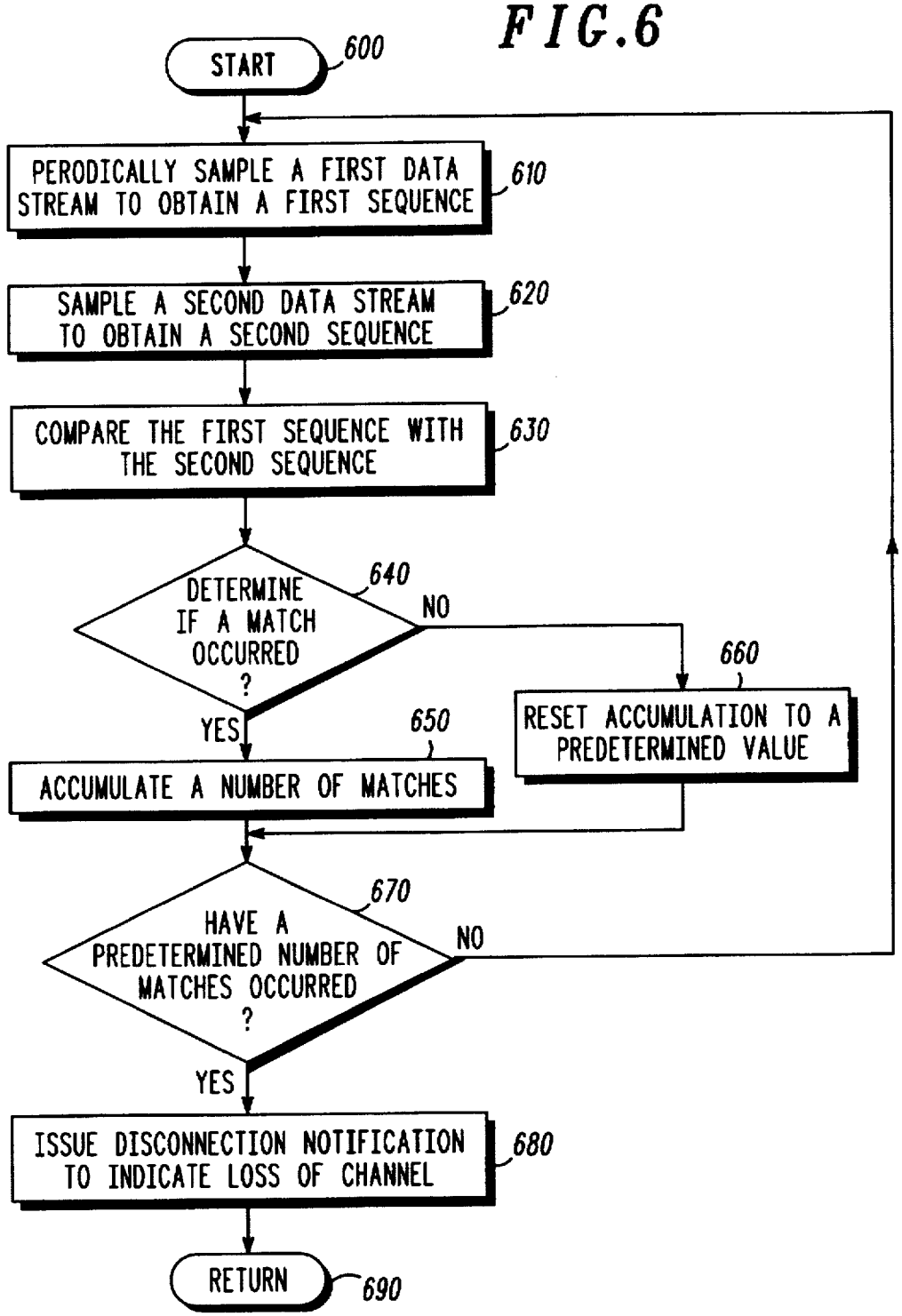
FIG. 6 is a flow diagram illustrating a method embodiment in accordance with the present invention.

FIG. 6 is a flow diagram illustrating a method embodiment of the present invention. As indicated above, in the preferred embodiment, the method (implemented as a set of program instructions) may be programmed into a digital signal processor (such as DSP 106, FIG. 2) or another processor arrangement (such as processor 108, FIG. 3). Referring to FIG. 6, the method embodiment comprises a method for comparing a first, n-bit sequence of a first data stream (or sequence) with a portion of a second bit sequence from a second data stream (or sequence), to obtain a predetermined number of matches, in order to detect the loss of the telecommunication channel. As mentioned above, the second bit sequence may have a variable number of bits, and the first n bit sequence is compared to an n-bit portion of the second sequence, to obtain a sequence (or data) match. As illustrated in FIG. 6, the method begins (start step 600) and proceeds with sampling a first data sequence (or stream) to obtain a first, n-bit sequence of bits, step 61 0. Next, either concurrently with step 610 or after a loop delay time, a second data stream (or sequence) is sampled which, again, may be continuous or periodic sampling, step 620, to form a second sequence. Next, in step 630, the first (n-bit) sequence from the first data sequence is compared with the second sequence from the second data stream to determine whether a match has occurred, step 640. If a match has occurred in step 640, then in step 650, the number of matches is accumulated, for example, in an up counter, a down counter, an accumulator, or another device as mentioned above, to form an accumulated value. If a match has not occurred in step 640, then in step 660, the accumulated value is reset to a predetermined value, such as zero an up counter or N for a down counter. Next, in step 670, the process determines whether a predetermined number of matches have occurred, for example, N matches, in which N is preferrably equal to twenty as mentioned above. If a predetermined number of matches have not occurred in step 670, then the process repeats, returning to step 610. As mentioned above, this process may be performed by the processor repeatedly continuing to periodically sample the first data stream to form the first sequence, to sample the second data stream to form the second sequence, and to compare the first sequence with the second sequence until a predetermined number of matches have occurred, to form a plurality of sampling and comparing episodes. If a predetermined number of matches have occurred in step 670, from this plurality of sampling and comparing episodes, then the process issues a notification that a disconnection has occurred, step 680, such as generating a disconnection signal or setting a disconnection flag, with the process finishing in return step 690.

In summary, an apparatus embodiment in accordance with the present invention includes a data communications device 100 which is coupleable to a telecommunications channel 102 for full duplex data transmission. The data communications device 100 then comprises: first, an interface circuit 435 coupleable to the telecommunications channel 102 for the transmission and reception of data signals on the telecommunications channel 102; and second, a processor connected to the interface circuit 435. As mentioned above, the processor may be processor 108 or may be processor 107 combined with a digital signal processor 106. The processor is responsive through a set of program instructions to transmit and receive data, and the processor is further responsive to periodically sample a first data stream to form a first sequence, the first sequence having a predetermined number of bits, (also as illustrated in method step 610); to sample a second data stream to form a second sequence (also as illustrated in method step 620); to compare the first sequence with the second sequence to determine an occurrence of a sequence match between the first sequence and a portion of the second sequence (also as illustrated in method steps 630 and 640); to repeatedly continue to periodically sample the first data stream to form the first sequence, to sample the second data stream to form the second sequence, and to compare the first sequence with the second sequence until a predetermined number of matches have occurred, to form a plurality of sampling and comparing episodes (also as illustrated in method steps 670, repeatedly returning to step 610); and when the predetermined number of matches have occurred, the processor is further responsive to generate a notification of the loss of a telecommunications channel connection (also as illustrated in method step 680).

Also as mentioned above, the processor (108 or 107 with DSP 106) is further responsive: to initially sample the second data stream continuously until a first match has occurred; to determine a time period during which the match has occurred; and when a first match has occurred, thereafter to periodically sample the second data stream based upon the time period during which the match occurred. In addition, the processor is further responsive: to sequentially accumulate a value representing the number of matches which have occurred during the plurality of sampling and comparing episodes to form an accumulated value (also as illustrated in method step 650); and when a match has not occurred during an episode of the plurality of sampling and comparing episodes, to reset the accumulated value to a predetermined value (also as illustrated in method step 660). Lastly, as mentioned above, the processor of the data communications device 100 is further responsive: to form a plurality of subsets of the second sequence, each subset having n bits, and each subset having an adjacent subset shifted by one bit to form a sequence of a plurality of adjacent subsets; to compare the first sequence with a first adjacent subset of the sequence of a plurality of adjacent subsets of the second sequence until a match occurs, and if no match has occurred, to compare the first sequence with a second subset of the plurality of subsets of the second sequence until a match occurs, the second subset being a next adjacent subset of the sequence of a plurality of adjacent subsets; and if no match has occurred, to continue to compare the first sequence with each next adjacent subset of the sequence of a plurality of adjacent subsets until the first sequence has been compared to all adjacent subsets of the sequence of a plurality of adjacent subsets of the second sequence.

As may be apparant from the discussion above, a significant advantage of a modem or other DCD, implemented in accordance with the present invention, is that a comparatively small amount of memory, both RAM and ROM, is needed. In addition, significantly less processor complexity and processor time is needed, substantially reducing the cost and expense of an apparatus embodiment.

Another significant advantage of the apparatus and method of the present invention is high reliability, with both high reliability in properly detecting actual disconnections and also a significant reduction in false detections. When the transmit signal and the receive signal match, then the method and apparatus in accordance with the present invention reliably determines that no actual information exchange is taking place. When no information is being exchanged, the modem or other DCD will then initiate a disconnection and shut down sequence, also reducing expenses to a user who will not be unnecessarily utilizing a telecommunication connection.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method for detecting a loss of a telecommunications channel connection in a data communications system having full duplex data transmission capability, the method comprising:
   (a) periodically sampling a first data stream to form a first sequence, the first sequence having a predetermined number of bits;
   (b) sampling a second data stream to form a second sequence;
   (c) comparing the first sequence with the second sequence to determine an occurrence of a sequence match between the first sequence and a portion of the second sequence;
   (d) repeating steps (a) through (c), inclusive, until a predetermined number of matches have occurred; and
   (e) when the predetermined number of matches have occurred, generating a notification of the loss of a telecommunications channel connection.

2. The method of claim 1 wherein the first sequence has a predetermined number of bits n, in which n is an integer value between 4 and 11.

3. The method of claim 2 wherein n is 8.

4. The method of claim 1 wherein the second sequence has a variable number of bits.

5. The method of claim 1 wherein step (b) further comprises:
   (b1) initially sampling the second data stream continuously until a first match has occurred;
   (b2) determining a time period during which the first match has occurred;
   (b3) when the first match has occurred, thereafter periodically sampling the second data stream based upon the time period during which the match occurred.

6. The method of claim 5 wherein the second sequence has a number of bits which varies between a first bit number and a second bit number, with the first bit number utilized in step (b1) and the second bit number utilized in step (b3).

7. The method of claim 1 wherein step (d) further comprises:
   (d1) sequentially accumulating a value representing the number of matches which have occurred during a plurality of repetitions of steps (a) through (c) to form an accumulated value;
   (d2) when a match has not occurred during a repetition of the plurality of repetitions of steps (a) through (c), resetting the accumulated value to a predetermined value.

8. The method of claim 1 wherein the first sequence is sampled from transmit data and the second sequence is transmitted from received data.

9. The method of claim 1 wherein the first sequence is sampled from received data and the second sequence is transmitted from transmit data.

10. The method of claim 1 wherein step (c) further comprises:
   (c1) forming a plurality of subsets of the second sequence, each subset having n bits, and each subset having an adjacent subset shifted by one bit to form a sequence of a plurality of adjacent subsets;
   (c2) comparing the first sequence with a first adjacent subset of the sequence of a plurality of adjacent subsets of the second sequence and determining if a match has occurred;
   (c3) if no match has occurred in step (c2), comparing the first sequence with a second subset of the plurality of subsets of the second sequence until a match occurs, the second subset being a next adjacent subset of the sequence of a plurality of adjacent subsets;
   (c4) if no match has occurred in steps (c2) and (c3), repeating step (c3) until the first sequence has been compared to all next adjacent subsets of the sequence of the plurality of adjacent subsets.

11. The method of claim 1, wherein the first sequence is equal to a sequence assigned to a constellation point.

12. The method of claim 1, wherein the periodic sampling has an interval which is greater than a loop delay time of a data communications device coupled to the telecommunications channel.

13. The method of claim 1, wherein the predetermined number of matches of step (d) further comprise a predetermined number of consecutive matches that have occurred during a predetermined interval of time.

14. The method of claim 1, wherein the predetermined number of matches is greater than 10.

15. The method of claim 1, wherein the periodic sampling of the first data stream has a sampling interval greater than 30 milliseconds.

16. A data communications device, the data communications device coupleable to a telecommunications channel for full duplex data transmission, the data communications device comprising:
   an interface circuit coupleable to the telecommunications channel for the transmission and reception of data signals on the telecommunications channels;
   a processor connected to the interface circuit, the processor responsive through a set of program instructions to transmit and receive data, the processor further responsive: to periodically sample a first data stream to form a first sequence, the first sequence having a predetermined number of bits; to sample a second data stream to form a second sequence; to compare the first sequence with the second sequence to determine the occurrence of a sequence match between the first sequence and a portion of the second sequence; to repeatedly continue to periodically sample the first data stream to form the first sequence, to sample the second data stream to form the second sequence, and to compare the first sequence with the second sequence until a predetermined number of matches have occurred, to form a plurality of sampling and comparing episodes; and when the predetermined number of matches have occurred, the processor further responsive to generate a notification of the loss of a telecommunications channel connection.

17. The data communications device of claim 16 wherein the first sequence has a predetermined number of bits n, in which n is an integer value between 4 and 11.

18. The data communications device of claim 17 wherein n is 8.

19. The data communications device of claim 16 wherein the second sequence has a variable number of bits.

20. The data communications device of claim 16 wherein the processor is further responsive: to initially sample the second data stream continuously until a first match has occurred; to determine a time period during which the match has occurred; and when a first match has occurred, thereafter to periodically sample the second data stream based upon the time period during which the match occurred.

21. The data communications device of claim 16 wherein the processor is further responsive: to sequentially accumulate a value representing the number of matches which have occurred during the plurality of sampling and comparing episodes to form an accumulated value; and when a match has not occurred during an episode of the plurality of sampling and comparing episodes, to reset the accumulated value to a predetermined value.

22. The data communications device of claim 16 wherein the processor is further responsive to sample the first sequence from transmit data and to sample the second sequence from received data.

23. The data communications device of claim 16 wherein the processor is further responsive to sample the first sequence from received data and to sample the second sequence from transmit data.

24. The data communications device of claim 16 wherein the processor is further responsive: to form a plurality of subsets of the second sequence, each subset having n bits, and each subset having an adjacent subset shifted by one bit to form a sequence of a plurality of adjacent subsets; to compare the first sequence with a first adjacent subset of the sequence of a plurality of adjacent subsets of the second sequence to determine if a match has occurred; and if no match has occurred, to compare the first sequence with a second subset of the plurality of subsets of the second sequence until a match occurs, the second subset being a next adjacent subset of the sequence of a plurality of adjacent subsets; and if no match has occurred, to continue to compare the first sequence with each next adjacent subset of the sequence of adjacent subsets until the first to occur of the occurrence of a match or the occurrence of the first sequence having been compared to all adjacent subsets of the sequence of a plurality of adjacent subsets.

25. The data communications device of claim 16, wherein the first sequence is equal to a sequence assigned to a constellation point.

26. The data communications device of claim 16, wherein the periodic sampling has an interval which is greater than a loop delay time the data communications device.

27. The data communications device of claim 16, wherein the predetermined number of matches further comprise a predetermined number of consecutive matches that have occurred during a predetermined interval of time.

28. The data communications device of claim 16, wherein the predetermined number of matches is greater than 10.

29. The data communications device of claim 16, wherein the periodic sampling of the first data stream has a sampling interval greater than 30 milliseconds.

30. An apparatus for detecting a loss of a telecommunications channel connection in a data communications system having a data communications device coupleable to the telecommunications channel for full duplex data transmission, the data communications device having a first data line and a second data line, the apparatus comprising:

a first sampler coupleable to the first data line for periodically sampling a first data stream to form a first sequence;

a second sampler coupleable to the second data line for sampling a second data stream to form a second sequence;

a comparator coupled to the first sampler to receive the first sequence and coupled to the second sampler to receive the second sequence, the comparator for comparing the first sequence with a portion of the second sequence to determine an occurrence of a sequence match, and when a sequence match has occurred, the comparator further generating a count signal; and a counter coupled to the comparator for receiving the count signal and for counting a number of consecutive count signals to form a count value, the counter further generating a disconnect notification when the count value has reached a predetermined value.

31. The apparatus of claim 30, further comprising:

a timer coupled to the first sampler, the second sampler, and the comparator, the timer controlling the sampling intervals of the first sampler and the second sampler.

32. The apparatus of claim 31 wherein the timer is initially set to a first value to control the second sampler to sample the second data stream continuously until a first match has occurred and to generate a time period indicating when the first match has occurred; and subsequent to the occurrence of the first match, the timer is set to a second value based upon the time period to control the second sampler to periodically sample the second data stream based upon the time period.

33. The apparatus of claim 31 wherein the counter is reset to a predetermined value when a consecutive match has not occurred.

* * * * *